United States Patent
Wechsler

[11] 3,919,621
[45] Nov. 11, 1975

[54] CONTROL SYSTEM FOR INVERTER CIRCUITS

[75] Inventor: Reuben Wechsler, Phoenix, Ariz.

[73] Assignee: Motorola, Inc., Chicago, Ill.

[22] Filed: Nov. 27, 1974

[21] Appl. No.: 527,574

[52] U.S. Cl. .................................... 321/14; 321/18
[51] Int. Cl.² ........................................ H02M 1/18
[58] Field of Search ............................... 307/252 M; 321/11–14, 18

[56] References Cited
UNITED STATES PATENTS
3,681,676  8/1972  Bourbeau .................... 321/13 X
3,821,630  6/1974  Kornrumpf et al. ......... 307/252 M X Primary Examiner—William M. Shoop
Attorney, Agent, or Firm—Harry M. Weiss; Michael D. Bingham

[57] ABSTRACT

A control system suitable for rendering an inverter circuit nonoperative in response to an undesirable load condition. In an SCR inverter circuit during the portion of the anode voltage cycle, when the SCR is normally nonconductive, the magnitudes of a first portion and a second portion of the voltage waveform appearing at the SCR are sensed. In response to the magnitude of the first portion being substantially equal to or greater than a predetermined percentage of the magnitude of the second portion of the waveform, a sense circuit enables a disabling circuit which renders the gating circuit nonoperative, whereby the SCR is not turned on. A timing circuit, responsive to the disabling circuit, deactivates the disabling circuit after a predetermined interval for enabling the gating circuit so that the load condition can be sampled. If the magnitude of the first portion of the sampled waveform remains greater than the magnitude of the second portion, the disabling circuit is once again enabled. The described testing cycle is repeated until such time as the magnitude of the first portion of the sample voltage waveform decreases below a predetermined percentage of the magnitude of the second portion of the waveform and the disabling circuit is inactivated, thereby rendering the gating circuit operative once more. Thus, the inverter circuit is returned to normal operation. A lock-out circuit, responsive only to the magnitude of the second portion of the voltage waveform appearing at the SCR increasing beyond a predetermined limit, is disclosed for also rendering the inverter circuit nonoperative.

15 Claims, 6 Drawing Figures

CONTROL SYSTEM FOR INVERTER CIRCUITS

BACKGROUND OF THE INVENTION

This invention relates to a control system suitable for providing control signals to inverter circuits, and more particularly, to a control system for a silicon controlled rectifier (SCR) inverter circuit that magnetically couples energy to a load circuit.

Because the load is not directly connected to the inverter circuit, but magnetically coupled, it is possible to spatially displace it from the inverter circuit; for example, to temporarily remove the load from the circuit in order to test the load away from the inverter circuit. If the load is removed from the inverter circuit, even temporarily, voltage magnitudes are created due to the change in the magnetic coupling factor that could damage the semiconductor devices of the inverter circuit. To render the inverter circuit nonoperative in order to protect the devices, a need exists to provide a control system that maintains the SCR in a nonconductive state until the inverter circuit is either manually turned off or until the load is returned to the magnetic field which re-establishes the desirable magnetic coupling.

It is also desirable, for conservation of energy, to render the inverter circuit nonoperative as the load is momentarily removed and then returned to the inverter circuit. A need exists for a control system that senses the removal of the load. For example, this could be done by comparing the voltage waveform appearing across the SCR to thereby shut off the inverter circuit and for restarting the inverter circuit as the load is returned.

A further problem arises as the energy that is stored in inductive components of the inverter circuit, during normal operation, is transferred to capacitive components when the inverter circuit is rendered nonoperative. A voltage magnitude much higher than peak operating voltage levels normally applied to the SCR may be created. A need exists for a control system to limit the voltage magnitude that may appear across the SCR to a predetermined value in order to minimize the blocking voltage requirements of the SCR to thereby reduce circuit cost.

A still further problem arises if a load of a particular permeability should be removed from the inverter circuit and replaced with a load of a greater permeability without manually turning the inverter circuit off and reducing the applied supply voltage magnitude to the inverter circuit. Because the load of higher permeability will absorb more energy, voltages of sufficient magnitude could be developed that may damage the semiconductor device. A need exists for a control system to render the inverter circuit nonoperative with occurrence of the above until the input power level is manually reduced and the inverter circuit is re-energized.

SUMMARY OF THE INVENTION

Accordingly, it is an object of this invention to provide an improved control system for inverter circuits.

Another object of this invention is to provide a control system for an SCR inverter circuit that magnetically couples energy to a load.

A further object is to provide a control system for alternately disabling or enabling an inverter circuit by sensing the voltage waveform appearing at the SCR.

A still further object is to provide a control system for disabling an inverter circuit in response to an excessive amount of power being drawn by the circuit load.

The control system of the invention is suitable for rendering the SCR inverter circuit alternately nonoperative and operative in response to comparing the magnitude of a first portion of the voltage waveform at the anode of the SCR with the magnitude of a second portion of the waveform during the portion of the gating cycle in which the SCR is normally nonconductive. Moreover, as the SCR inverter circuit is rendered nonoperative, the control system provides for periodically gating the SCR so that the voltage waveform can be sampled and the SCR inverter circuit rendered operative as the magnitude of the first portion of the voltage waveform at the SCR decreases below a predetermined percentage of the magnitude of the second portion of the waveform. The control system includes a gating circuit for cyclically rendering the SCR conductive. A sensing circuit is connected to the anode of the SCR of the inverter circuit for providing a pair of differential output signals in relation to the magnitude of the first and second portion of the voltage waveform appearing at the anode of the SCR. A disabling circuit receiving the pair of differential output signals from the sensing circuit provides a control voltage for rendering the gating circuit nonoperative as the first signal of the pair of differential output signals become substantially equal to or greater than the second signal of the pair of differential output signals. A timing circuit is connected to the output of the disabling circuit and provides for rendering the gating circuit operative for a single gating cycle at a periodic and predetermined rate. Also connected to the anode of the SCR is a lock-out circuit connected to an input portion of the disabling circuit which renders the gating circuit nonoperative in response to the second portion of the waveform appearing at the anode of the SCR becoming greater than the predetermined value. A clamping circuit is connected to the disabling circuit and across the SCR which provides over-voltage protection to the SCR during the time that the gating circuit is rendered nonoperative by the disabling circuit. Further objects and advantages of the invention will become apparent as the description proceeds.

DETAILED DESCRIPTION OF THE PREFERRED EMBODIMENT

Figure 1:
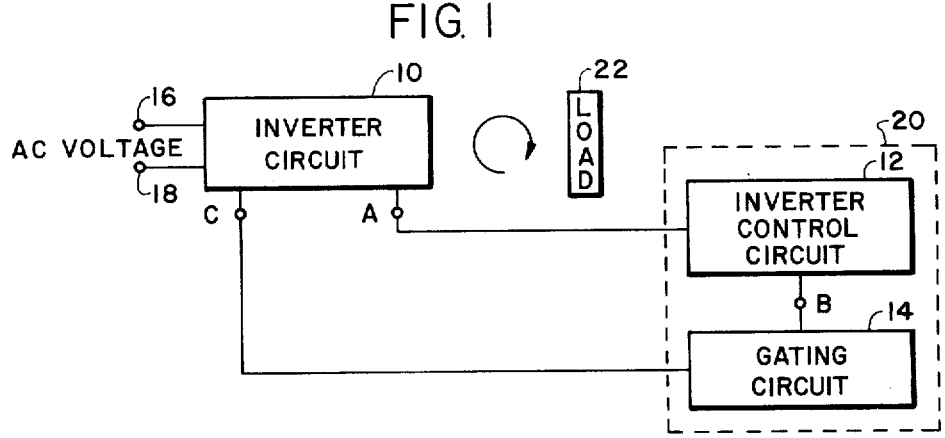
FIG. 1 is a block diagram illustrating an SCR inverter circuit and control system of the embodiment of the invention.

Referring to FIG. 1, there is shown an SCR inverter circuit 10, an inverter control system 20 comprising inverter control circuit 12 and gating circuit 14 of the embodiment of the invention.

Inverter circuit 10 is illustrated as comprising input terminals 16 and 18 which are adapted to receive an alternating current (AC) voltage that is supplied. Inverter circuit 10 is comprised of a full-wave rectifier, a filter, means for megnetically coupling energy to load 22 and an SCR device which provides for gating a current to develop the aforementioned magnetic energy. An output, terminal A, that is connected to the SCR, is provided to the input of inverter control system 20 to inverter control circuit 12. The input of gating circuit 14 is coupled to the output of inverter control circuit 12 at terminal B. Gating circuit 14 provides a gating signal for rendering the SCR of inverter circuit 10 conductive, and is connected to inverter circuit 10 at terminal C.

During normal operation, as will be explained later, inverter control circuit 12 is bufferred from gating circuit 14 and the latter renders the SCR of inverter circuit 10 conductive at a predetermined rate.

Figure 2:
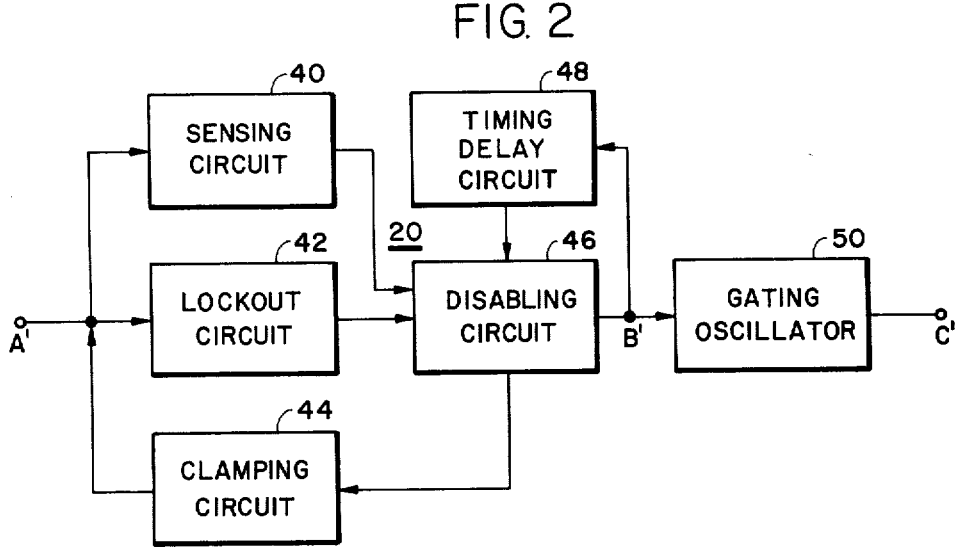
FIG. 2 is a block diagram illustrating the protection system of the embodiment of the invention.

FIG. 2 illustrates the basic circuits comprising inverter control system 20 in block diagram form. Inverter control system 20 includes terminal A' which corresponds to terminal A of FIG. 1. The waveform developed across the SCR of inverter circuit 10 at terminal A' is simultaneously applied to sensing circuit 40 and lock-out circuit 42. The outputs of sensing circuit 40 and lock-out circuit 42 are connected to respective input terminals of disabling circuit 46. As will be explained in detail later, disabling circuit 46 renders gating oscillator 50 nonoperative in response to an undesirable load condition which causes the waveform developed across the inverter circuit SCR to be such that control signals are applied by sensing circuit 40 and lock-out circuit 42 to it. In response to disabling circuit 46 being activated, timing delay circuit 48 provides for deactivating the disabling circuit at a predetermined time interval so that gating circuit 14 is rendered operative. In this fashion, a testing mode is initiated, also to be explained later, in order that the waveform appearing at terminal A' may be sampled. If the waveform is such that the disabling circuit is again reactivated, gating circuit 14 is again rendered nonoperative. The testing mode of operation is continually repeated until such time as the load condition of the inverter circuit is returned to a normal operating condition which renders the disabling circuit nonoperative. Terminals B' and C' correspond to like terminals B and C illustrated in FIG. 1.

INVERTER CIRCUIT OPERATION

Figure 4:
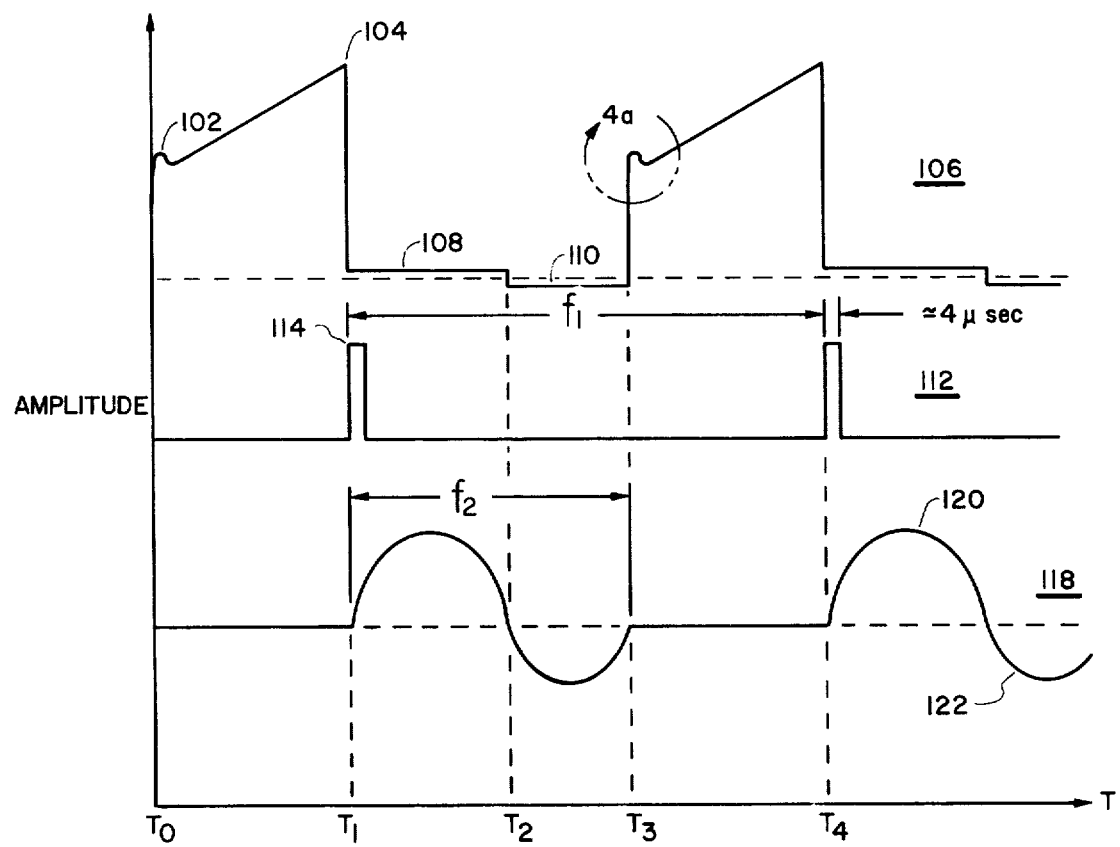
FIG. 4 shows waveforms useful in understanding the circuit of FIG. 3.
Figure 4A:
FIG. 4a shows an enlarged portion of a waveform of FIG. 4.

The operation of inverter circuit 10, for example, an SCR inverter circuit, is explained with the aid of the waveforms illustrated in FIG. 4 and FIG. 4a. Waveform 106 illustrates the voltage that appears across the SCR and which is applied to inverter control system 20 at terminal A'. At time T1, the SCR is rendered conductive by gating pulse 114 (waveform 112) and provides the current path for developing the energy that is magnetically coupled to load 22. The SCR remains conductive until the forward biasing current becomes such that conduction cannot be sustained, time T2. Thereafter, the SCR remains nonconductive until the next gating pulse 114 is applied to its gate, time T4. As the SCR conducts, a bias is developed in inverter circuit 10 across an internal capacitor (not shown) which renders a reverse diode (connected across the SCR in a manner known in the art) conductive between times T2 and T3, when the SCR is nonconductive. Waveform 118 illustrates that the conduction cycle of the SCR and the reverse diode occurs at a frequency f2. The SCR conducts during the positive portion 120 and the reverse diode conducts during negative portion 122 of cycle 118.

As the reverse diode ceases to conduct, time T3, a ringing phenomenon occurs because of a resonant circuit (not shown) which is included in inverter circuit 10. The ringing effect occurs between times T3 and T4 and is shown by that portion of waveform 106 indicated by reference numeral 102. FIG. 4a illustrates an exploded view of this ringing phenomenon which occurs at a frequency much higher than the inverter operating frequency. After both the SCR and the reverse diode are rendered nonconductive, the voltage across the SCR approaches a value as illustrated by reference numeral 104 of waveform 106. At this time, T4, another gating pulse 114 is again applied to the SCR rendering it conductive and the aforementioned cycle is repeated. Portions 108 and 110 of waveform 106 illustrate the voltage waveform appearing at the SCR during the conduction period of the SCR and the reverse diode.

As illustrated in FIG. 4, the repetition of gating cycle 112 is of a frequency, $f1$, and the repetition of the SCR and reverse diode conduction period 118 is of a frequency $f2$. By way of example, $f1$ is less than $f2$ which allows the aforementioned internal capacitor to recharge to the voltage magnitude indicated by reference numeral 104 of waveform 106. Hence, a forward bias potential is developed at the SCR so that in response to gating pulse 114 it is again rendered conductive. In normal operation, the above described is repeated for supplying energy to the inverter load 22.

INVERTER CONTROL SYSTEM

Figure 3:
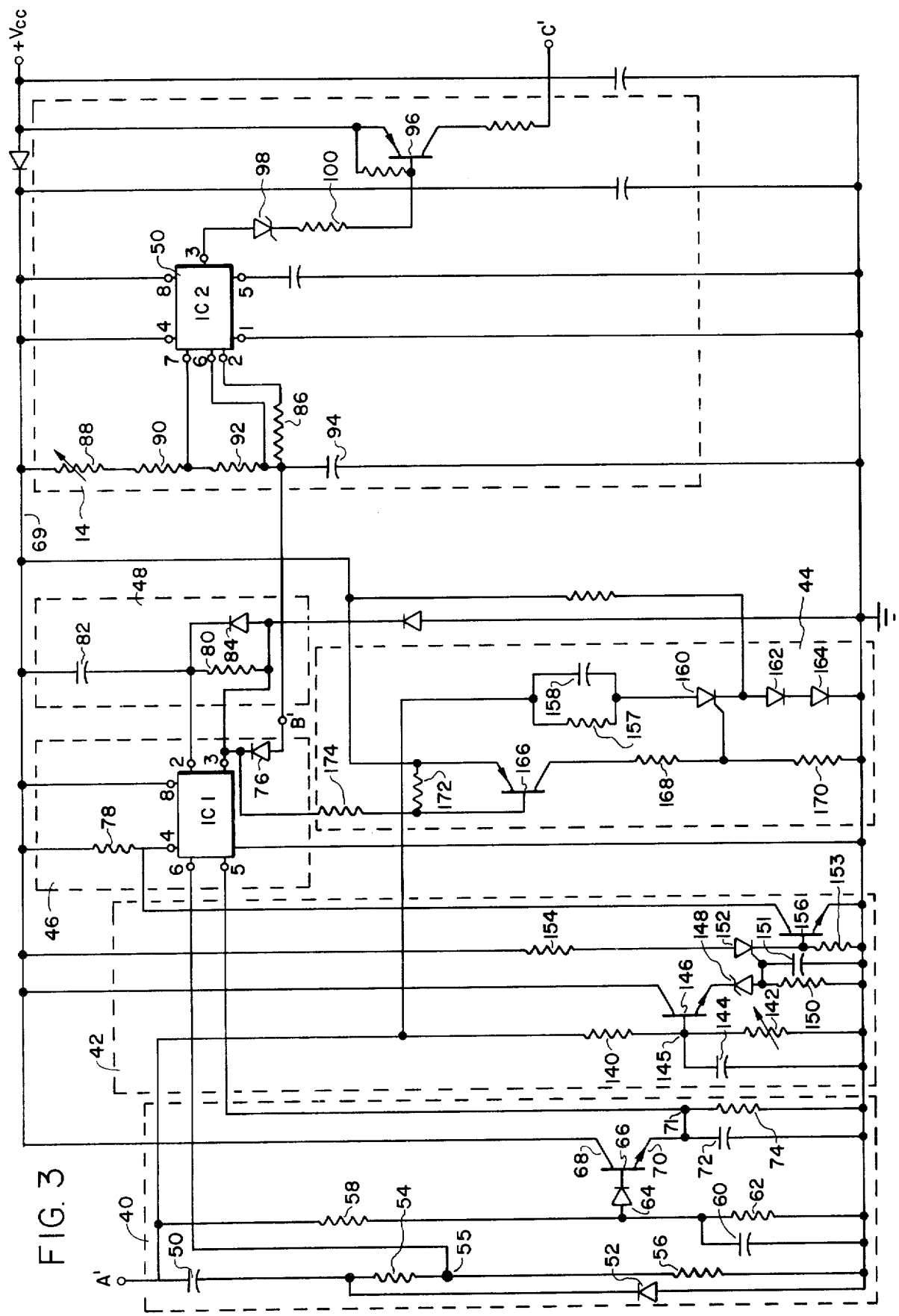
FIG. 3 is a schematic diagram illustrating a preferred embodiment of the invention.
Figure 5:
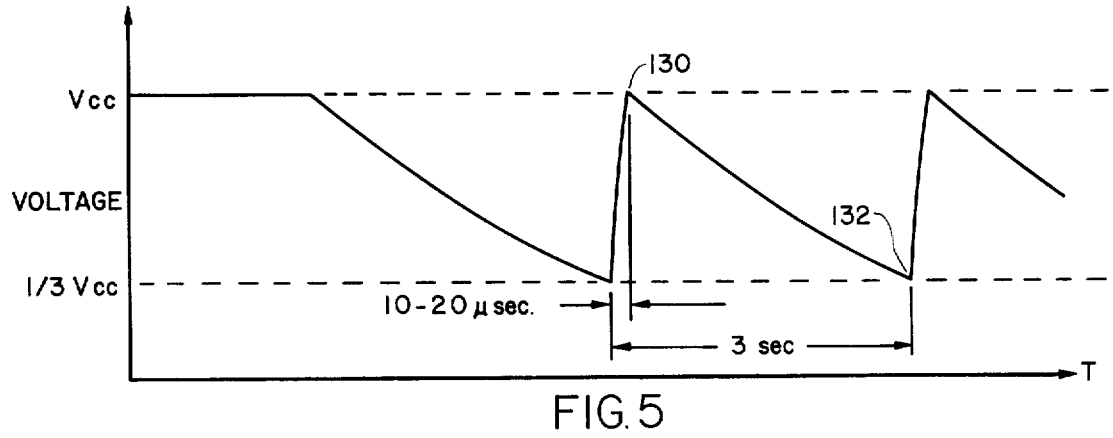
FIG. 5 shows waveforms also useful for understanding the circuit of FIG. 3.

Referring now to FIGS. 3 – 5, the description of the embodiment of the invention can be more fully explained. Referring to FIG. 3, there is shown in respective dashed boxes; sensing circuit 40, lock-out circuit 42, clamp circuit 44, disabling circuit 46, timing circuit 48 and gating circuit 14, comprising inverter control system 20.

The voltage waveform across the SCR is applied to sensing circuit 40 at terminal A'. The high frequency portion 102, of voltage waveform 106 (FIG. 4), is filtered by capacitor 50 to a voltage divider network which includes diode 52, resistors 54 and 56, with an output terminal provided between resistors 54 and 56 which is connected to pin 6 of integrated circuit (IC–1) of disabling circuit 46. Portion 104 of waveform 106 is filtered from terminal A' to a voltage divider network including resistor 58, capacitor 60 and resistor 62, which is connected in parallel with capacitor 60. An output terminal is provided between the junction of resistors 58 and 62 which is connected to the anode of diode 64, that has its cathode connected to the base of transistor 66. Collector 68 of transistor 66 is returned to the positive supply voltage $V_{cc}$ by power supply conductor 69. Transistor 66, functioning as an emitter-follower has an output taken across capacitor 72 and resistor 74 which returns emitter 70 to circuit ground. The output signal from transistor 66 is coupled to pin 5 of IC–1.

IC–1 of disabling circuit 46, for example, a Motorola MC1455 timing circuit that has been modified to bring the output of an internal threshold comparator directly to an outside terminal (pin 5) is connected in a monostable mode. As such, when the input voltage at pin 5 remains greater than the input voltage at pin 6, pin 3 which is coupled to gating circuit 14 through diode 76 is at a "high" state, reverse biasing diode 76. Pin 4 of IC-1 is connected to power supply conductor 69 through resistor 78. Pin 8 is connected directly to power supply conductor 69 and pin 1 is directly connected to the circuit ground terminal. Timing circuit 48 includes resistor 80 and discharge diode 84 connected between pin 2 and pin 3 of IC-1 and capacitor 82 connected from pin 2 to power supply conductor 69.

The output of disabling circuit 46, terminal B', is connected to gating circuit 14. Under normal operating conditions, diode 76 is reverse biased and buffers gating oscillator 50 from disabling circuit 46. Gating oscillator 50 comprises an integrated circuit (IC-2), for example, a Motorola MC1455 timing circuit connected as an astable oscillator. Pin 2 of IC-2 is connected through resistor 86 to terminal B'. Also connected to terminal B' is pin 6. The frequency of operation of oscillator 50 is set at, for example, 20 KHz by the series connection between power supply conductor 69 to circuit ground through resistors 88, 90, 92 and capacitor 94. Pin 7 of IC-2 is connected to the junction between resistor 90 and 92. The junction between resistor 92 and capacitor 94 is connected to terminal B'. The operation of gating oscillator 50 is described in detail in the "Motorola Linear Integrated Circuits Data Book", 3rd Edition, pages 8-294 through 8-300 and will be explained briefly later. The output signal of gating oscillator 50 (pin 3) is coupled to the base of transistor 96 through zener diode 98 and resistor 100. Transistor 96 and associated circuitry amplifies the oscillating output signal from gating oscillator 50 to provide a gate triggering signal to SCR 28 at output terminal C'.

In normal operation, gating oscillator 50 develops a gating signal for gating SCR 28 conductive, for example, at a 20 KHz rate. The free-running frequency and duty cycle of gating oscillator 50 are both controlled by the external timer circuit comprising resistors 88, 90, 92 and capacitor 94. In the astable mode, the external timer circuit is connected so that it will re-trigger itself and cause the voltage across capacitor 94 to oscillate between approximately ⅓ $V_{CC}$ and ⅔ $V_{CC}$. Capacitor 94 charges to ⅔ $V_{CC}$ through resistors 88, 90 and 92 and discharges through resistor 92. The output signal is amplified by transistor 96 to an appropriate level for gating SCR 28. As illustrated in FIG. 4, gating signal 112 comprising a rectangular pulse 114 recurs at a 20 KHz rate. The width of pulse 114 is approximately 4 microseconds.

If load 22 is removed from inverter circuit 10, it is desirable to render SCR inverter circuit 10 nonoperative to both protect the circuit from voltage transients and to conserve energy. Referring to FIG. 3, a control system including sensing circuit 40 and disabling circuit 46 of the embodiment of the invention is illustrated for rendering SCR inverter circuit 10 nonoperative in response to the removal of load 22, and for restarting inverter circuit 10 as load 22 is returned to the inverter circuit.

As load 22 is removed from the inverter circuit, the magnetic loading factor is altered which effectively decreases the inductance of the aforementioned resonant circuit. Hence, the magnitude of ringing voltage 102 increases with respect to the magnitude of voltage 104.

Sensing circuit 40, connected across the SCR, develops a pair of output signals in direct relationship to the respective magnitudes of ringing voltage 102 and voltage 104.

In operation, ringing voltage 102 is coupled through high-pass filter capacitor 50 to the resistive divider network including resistors 54 and 56. The voltage developed at terminal 55 is applied to disabling circuit 46 at pin 6 of IC-1. Simultaneously, voltage 104 is coupled to the base of emitter-follower transistor 66 through resistor 58 and the low-pass filter including capacitor 60 and resistor 62. The voltage developed at terminal 71 across resistor 74 is also applied to disabling circuit 46 at pin 5 of IC-1. During normal operation, the magnitude of the voltage at pin 5 is greater than the voltage at pin 6 and the voltage level at pin 3 is at a "high" state. Thus, diode 76 is reverse biased and gating circuit 14 is operative. However, as the cooking vessel is lifted off the burner and the voltage magnitude at pin 6 becomes substantially equal to or greater than the voltage magnitudes of pin 5, IC-1 changes states and the voltage level at pin 3 switches to a "low" state. In response to IC-1 switching, diode 76 is then forward biased and capacitor 94 is quickly discharged which renders gating oscillator 50 and, therefore, SCR inverter circuit 10, nonoperating.

Referring to FIG. 5, as the voltage level at pin 3 of IC-1 goes to a "low" state, timing circuit 48 is activated to provide a sampling function for rendering SCR inverter circuit 10 operative after load 22 is returned to the inverter circuit. While pin 3 is normally in a "high" state, capacitor 82 is at the potential of $V_{CC}$, reference numeral 130. When IC-1 switches and pin 3 goes to a "low" state, capacitor 82 will charge negatively through resistor 80 until the voltage at pin 2 of IC-1 reaches a value of approximately ⅓ $V_{CC}$, reference numeral 132. The time constant of the RC network is such that approximately three seconds is required to charge capacitor 82 negatively to ⅓ $V_{CC}$. As the magnitude of the voltage at pin 2 decreases to ⅓ $V_{CC}$, IC-1 changes states and pin 3 goes to a "high" state and diode 84 becomes forward biased and allows capacitor 82 to rapidly (approximately 10 – 20 microseconds) discharge back to the magnitude of $V_{CC}$. Thus, gating circuit 14 will be enabled for rendering the SCR conductive. If, however, the magnitude of voltage at pin 6 is still greater than the magnitude at pin 5, the output voltage at pin 3 remains low and capacitor 82 repeats the above cycle. Therefore, gating oscillator 50 will continue to be rendered nonoperative until load 22 is returned to the inverter circuit, at which time the magnitude of the voltage at pin 6 is reduced with respect to pin 5, which allows IC-1 to remain in its normal state.

The above described circuit provides the function of rendering the SCR inverter nonoperative in response to the removal of load 22 from the inverter circuit. Thus, as load 22 is removed from the inverter circuit, energy is conserved which is a significant advantage provided by the control system.

Lock-out circuit 42 is provided to shut down SCR inverter circuit 10 in response to an excessive amount of power being drawn by load 22. If load 22 of a particular permeability should be removed from the inverter circuit and replaced by another load of a different permeability, excessive power could be absorbed by the latter load creating voltages and currents which could damage the SCR.

Lock-out circuit 42, also connected across the SCR, is provided to shut down the inverter circuit if the above-mentioned situation should occur. Referring to FIG. 3, lock-out circuit 42 includes; resistor 140, connected to terminal A' and to resistor 142. The other end of resistor 142 is connected to circuit ground. Capacitor 144 is connected in parallel with resistor 142. The voltage developed across resistor 142 is applied to the base of transistor 146 at terminal connection 145. The emitter of transistor 146 is returned to ground through the series connection of zener diode 148 and resistor 150 with its collector connected directly to power supply conductor 69. Transistor 146 develops a gate triggering signal across resistor 150 which is applied to the gate electrode of SCR 152 and across capacitor 151 to ground. The anode of SCR 152 is coupled to power supply conductor 69 through resistor 154 and its cathode electrode is connected to the base of transistor 156 and through resistor 153 to ground. The emitter of transistor 156 is returned to circuit ground and its collector to pin 4 of IC-1 of disabling circuit 46.

The peak voltage reference numeral 104, appearing across the SCR, is proportional to the amount of power absorbed by load 34. If more power should be absorbed by load 34, as described above, the voltage magnitude of peak voltage 104 will also increase. When the divided down magnitude of peak voltage 104 across resistor 142 exceeds the sum of the breakdown voltage of zener diode 148 and the base to emitter voltage of transistor 146, transistor 146 is rendered conductive. The magnitude of peak voltage 109 at which transistor 146 conducts is made variable by controlling the value of resistor 142. When transistor 146 conducts, a gate triggering signal is developed across resistor 150, which causes SCR 152 to fire and to render transistor 156, that is connected thereto, conductive. In response to transistor 156 becoming conductive, the voltage at pin 4 of IC-1 is pulled down to a low level which, in turn, causes the output of IC-1 to switch states. Thus, the output voltage (pin 3) switches to a "low" state in gating oscillator 50 is rendered nonoperative in the same manner as described previously. Gating oscillator 50 will remain off until such time that the power supply voltage is turned off, and the input power to the inverter circuit is reduced.

Also disclosed in the embodiment of the invention is clamping circuit 44. The SCR is also connected to one end of resistor 157 and capacitor 158, connected in parallel, at terminal A'. The other end of resistor 157 and capacitor 158 is connected to the anode of SCR 160 with its cathode electrode coupled to circuit ground through diodes 162 and 164. The gate of SCR 160 is coupled to the collector of transistor 166 through resistor 168 and is also returned to circuit ground through resistor 170. The base of transistor 166 is connected to the junction of resistors 172 and 174 which form a base bias network. The other end of resistor 172 is connected to power supply conductor 69 with the other end of resistor 174 connected to pin 3 of IC-1 of disabling circuit 46. The emitter of transistor 166 is directly connected to power supply 69.

Clamping circuit 44 is provided for over-voltage protection of the SCR and the reverse diode of inverter circuit 10. While the inverter circuit is operating, there is a net DC current through the filter choke of the inverter circuit and, therefore, energy is stored in this inductor. When gating circuit 14 is rendered nonoperative, the energy stored in the inductor is transferred to a filter capacitor which would raise its voltage to a level much higher than the peak operating voltage normally applied to the SCR and the reverse diode. However, clamping circuit 44 limits the level of voltage potential across the capacitor to a predetermined value. Hence, clamping circuit 44 allows the SCR and the reverse diode to be of lower blocking voltage capacity, and therefore, reduces circuit costs.

In operation, as gating circuit 14 is rendered nonoperative due to pin 3 of IC-1 going to a "low" state, current is drawn through resistors 172 and 174 thereby providing base drive to transistor 166, rendering it conductive. As transistor 166 begins to conduct, a gate trigger signal is developed across resistor 170 which fires SCR 160. Hence, the energy stored in the aforementioned inductor is transferred to capacitor 158 of clamping circuit 44, which if chosen of a sufficiently large value, will allow the voltage level across the filter capacitor to rise only slightly. The addition of diodes 162 and 164 in the cathode circuit of SCR 160 are to provide a small reverse bias voltage for the gate-to-cathode junction of SCR 160. This greatly enhances the $dv/dt$ capability of the SCR, thereby reducing the possibility of false triggering and allows the use of a lower cost SCR.

Several salient solutions to the use of SCR inverter circuits for magnetically coupling energy to a suitable load are provided by the embodiment of this invention. The inverter control system described herein provides for rendering the inverter circuit inoperative under conditions in which voltage transients could be created that would damage the power devices of the inverter circuit. Also, a means is disclosed wherein the inverter circuit is temporarily rendered inoperative to conserve energy.

While the above detailed description has shown and described the fundamental novel features of the embodiment of the invention, it will be apparent to those skilled in the art that many changes and modifications may be made without departing from the spirit of the invention.

What is claimed is:

1. In an inverter circuit for electromagnetically coupling energy to a load, a control circuit including an input and an output terminal, comprising:
    gating means connected to a control terminal of the inverter circuit at said output terminal, for periodically rendering the silicon controlled rectifier conductive;
    sensing means adapted to be connected to an output terminal of the inverter circuit at said input terminal, for providing a differential pair of output signals at first and second output terminals thereof, in response to a first and a second portion of the voltage appearing at said anode of the silicon controlled rectifier; and
    disabling means receiving said differential output signals from said sensing means and connected to said gating means for rendering said gating means nonoperative in response to the magnitude of the first of said pair of differential signals being substantially equal to or greater than the magnitude of the second of said pair of differential output signals whereby the silicon controlled rectifier is rendered nonoperative.

2. The control circuit of claim 1 wherein said gating means includes in combination:
oscillator means for providing a periodic gating signal at an output terminal thereof; and
means receiving said periodic gating signal for amplifying said periodic gating signal to a magnitude sufficient to render the silicon controlled rectifier periodically conductive.

3. The control circuit in accordance with claim 2 wherein said oscillating means includes in combination:
first circuit means having a first and a second terminal, said first terminal being connected to a positive power supply;
second circuit means having a first and a second terminal, said first terminal connected to said second terminal of said first circuit means;
third circuit means having a first and second terminal, said first terminal connected to said second terminal of said second control means;
fourth circuit means having a first and second electrode, said first electrode being connected to said second terminal of said third circuit means and said second electrode connected to a reference terminal of the control circuit;
first electron control means having a first electrode, a second electrode, a third electrode, a fourth electrode, a fifth electrode, a sixth electrode, a seventh electrode and an eighth electrode, said first electrode connected to said reference terminal of the control circuit, said third electrode being connected to said output terminal of said oscillating means, said fourth electrode connected to said positive power supply, said fifth electrode coupled to said reference terminal of the control circuit, said sixth electrode connected to said second terminal of said third circuit means, said seventh electrode connected to said second terminal of said second circuit means, and said eighth electrode connected to said positive power supply;
fifth circuit means connected from said second terminal of said third circuit means to said second electrode of said first electron means; and
said second terminal of said third circuit means being connected to said disabling means.

4. The control circuit of claim 3 wherein said amplifying means includes:
second electron control means having a first electrode, a second electrode and a control electrode, said first electrode connected to said positive power supply;
sixth circuit means connected from said third electrode of said first electron control means to said control electrode of said second electron control means;
seventh circuit means connected from said control electrode of said second electron control means to said first electrode of said second electron control means; and
eighth circuit means coupling said second electrode of said second electron control means to the gate electrode of the silicon controlled rectifier of the inverter circuit.

5. The control circuit in accordance with claim 1 wherein said sensing means includes in combination:

first circuit means having a first and second electrode, said first electrode connected to the anode electrode of the silicon controlled rectifier of the inverter circuit;
second circuit means having a first and second lead, said first lead connected to said second electrode of said first circuit means;
third circuit means having a first and second lead, said first lead connected to said second lead of said second circuit means and said second lead of said third circuit means connected to a reference terminal of the control circuit;
first electron control means having a first and second electrode, said first electrode connected to said reference terminal of the control circuit and said second electrode connected to said first lead of said second circuit means;
fourth circuit means having a first and second lead, said first lead connected to the anode of the silicon controlled rectifier of the inverter circuit;
fifth circuit means having a first and a second lead, said first lead connected to said second lead of said fourth circuit means and said second lead connected to said circuit reference terminal of the control circuit;
sixth circuit means having a first and second electrode, said first electrode connected to said first lead of said fifth circuit means and said second electrode connected to said reference terminal of the control circuit;
second electron control means having a first and second electrode, said first electrode connected to said second lead of said fourth circuit means;
third electron control means having a first and second electrode and a control electrode, said control electrode connected to said second electrode of said second electron control means and said second electrode of said third electron control means connected to a positive power supply;
seventh circuit means having first and second leads, said first lead connected to said first electrode of said third electron control means and said second lead connected to said reference terminal of the control circuit;
eighth circuit means having a first and a second electrode, said first electrode connected to said first electrode of said third electron control means and said second electrode connected to said reference terminal of the control circuit; and
said sensing means having a first and a second output terminal, said first output terminal connected to said second lead of said second circuit means and said second output terminal connected to said first electrode of said third electron control means.

6. The control circuit of claim 5 wherein:
said first and said second electron control means including PN diodes; and
said third electron control means including a bipolar transistor.

7. The control circuit of claim 1 wherein said disabling means further includes:
monostable circuit means receiving said differential output signals from said sensing means for causing the output voltage applied at an output terminal thereof to switch states in response to the magnitude of said first of said pair of differential output signals being substantially equal to or greater than the magnitude of said second pair of differential output signals;

timing means connected to said output of said monostable circuit means for periodically and momentarily rendering said gating means operative in response to said voltage at said output of said monostable circuit means switching states; and said output terminal of said monostable circuit means being connected to said gating means.

8. The control circuit of claim 7 wherein said monostable circuit means comprises an electron control means including first and second input terminals, first and second output terminals, a first electrode, a second electrode, and a third electrode, said first and second input terminals connected to said first and second output terminals of said sensing means, said first electrode connected to a reference terminal of the control circuit, said second electrode coupled to a positive power supply, and said third electrode connected to said positive power supply.

9. The control circuit of claim 8 wherein said timing means includes:

first circuit means connected between said first and second output terminals of said first electron control means;

second electron control means having a first and second electrode, said first electrode connected to said first output terminal of said first electron control means and said second electrode of said second electron control means connected to said second output terminal of said first electron control means; and second circuit means connected between said positive power supply and said second output of said first electron control means.

10. The control circuit of claim 9 further including:

lock-out circuit means connected between the anode of the silicon control rectifier of the inverter circuit and said disabling means for rendering said gating means nonoperative in response to the magnitude of said second portion of the voltage appearing at said anode of the silicon controlled rectifier of the inverter circuit becoming greater than a predetermined value; and clamping circuit means connected across said anode and the cathode of the silicon control rectifier of the inverter circuit and having an input terminal coupled to said disabling means for maintaining said voltage appearing at said anode of the silicon control rectifier of the inverter circuit at a predetermined value in response to said disabling means rendering said gating means nonoperative.

11. The control circuit of claim 10 wherein said lockout circuit means includes in combination:

third electron control means having a first electrode, a second electrode and a control electrode, said second electrode connected to said positive power supply;

third circuit means connected between said anode of the silicon control rectifier of the inverter circuit and said control electrode of said third electron control means;

fourth circuit means connected between said control electrode of said third electron control means and said reference terminal of the control circuit;

fourth electron control means having a first and second electrode, said second electrode connected to said first electrode of said third electron control means;

fifth circuit means connected between said first electrode of said fourth electron control means and said ground terminal of the control circuit;

fifth electron control means having a first and second electrode and a control electrode, said control electrode connected to said first electrode of said fourth electron control means and said first electrode coupled to said positive power supply;

sixth electron control means having a first electrode, a second electrode and a control electrode, said first electrode connected to said ground terminal of the control circuit, said control electrode connected to said second electrode of said fifth electron control means and said second electrode connected to said second electrode of said first electron control means of said monostable circuit means; and said fourth circuit means including a resistor and a capacitor connected in parallel with each other.

12. The control circuit of claim 11 wherein said clamping means further includes:

sixth circuit means having a first and second terminal, said first terminal connected to said anode of the silicon controlled rectifier of the inverter circuit;

seventh electron control means having a first electrode, a second electrode and a control electrode, said first electrode connected to said second terminal of said sixth circuit means;

eighth electron control means having a first electrode and a second electrode, said first electrode being connected to said second electrode of said seventh electron control means and coupled to said positive power supply and said second electrode connected to said reference terminal of the control circuit;

seventh circuit means having a first and second lead, said first lead connected to said positive power supply;

eighth circuit means having a first and second lead, said first lead connected to said second lead of said seventh circuit means and said second lead connected to said first output of said first electron control means of said monostable circuit means;

ninth electron control means having a first electrode, a second electrode and a control electrode, said control electrode connected to said first lead of said eighth circuit means, and said first electrode connected to said positive power supply;

ninth circuit means having a first and second lead, said first lead connected to said second electrode of said ninth electron control means and said second lead connected to said control electrode of said seventh electron control means; and tenth circuit means having a first and second lead, said first lead connected to said control terminal of said seventh electron control means and to said second lead of said ninth circuit means and said second lead connected to said ground terminal of the control circuit.

13. The control circuit of claim 8 wherein said monostable circuit means further includes third electron control means having a first and second electrode, said first electrode coupled to said gating means and said second electrode connected to said first output terminal thereof.

14. A control circuit for a silicon controlled rectifier inverter circuit, comprising:
- gating means connected to a gate electrode of the silicon controlled rectifier of the inverter circuit for periodically rendering the silicon controlled rectifier conductive;
- sensing means connected to the anode of the silicon control rectifier for providing a differential pair of output signals at first and second output terminals thereof in response to a first and a second portion of the voltage appearing at said anode of the silicon controlled rectifier;
- disabling means receiving said differential output signals from said sensing means and connected to said gating means for rendering said gating means nonoperative in response to the magnitude of the first of said pair of differential output signals being greater than the magnitude of the second said pair of differential output signals so that the silicon controlled rectifier is rendered nonoperative;
- lock-out circuit means connected between said anode of the silicon controlled rectifier and said disabling means for providing a control signal to said disabling means so that said gating means is rendered nonoperative in response to the magnitude of the second portion of the voltage appearing at said anode of the silicon controlled rectifier of the inverter circuit becoming greater than or equal to a predetermined value; and
- clamping means, connected between said anode of the silicon controlled rectifier of the inverter circuit and the cathode electrode of the silicon controlled rectifier and having an input terminal coupled to said disabling means for limiting the voltage magnitude at said anode of the silicon controlled rectifier to a predetermined magnitude in response to said disabling means rendering said gating means nonoperative.

15. In a silicon controlled rectifier inverter circuit for magnetically coupling energy to a load, a method for rendering the silicon controlled rectifier nonoperative in response to an undesirable load condition, comprising the steps of:
- sensing a first and second portion of the magnitude of voltage appearing at the anode of the silicon controlled rectifier to develop first and second differential output signals; and
- rendering the silicon controlled rectifier nonoperative in response to said first differential output signal being substantially equal to or greater than said second differential output signal.

* * * * *